(12) United States Patent
Jacobsen et al.

(10) Patent No.: US 11,859,721 B2
(45) Date of Patent: Jan. 2, 2024

(54) MIXING VALVE AND HEATING OR COOLING SYSTEM

(71) Applicant: GRUNDFOS HOLDING A/S, Bjerringbro (DK)

(72) Inventors: Kjeld Vinther Jacobsen, Bjerringbro (DK); Kristian Skriver Dahl, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 0 days.

(21) Appl. No.: 17/535,487

(22) Filed: Nov. 24, 2021

(65) Prior Publication Data

US 2022/0163123 A1    May 26, 2022

(30) Foreign Application Priority Data

Nov. 25, 2020  (EP) .................................... 20209825

(51) Int. Cl.
| | |
|---|---|
| *F16K 11/087* | (2006.01) |
| *F16K 11/078* | (2006.01) |
| *F16K 5/12* | (2006.01) |
| *G05D 23/13* | (2006.01) |

(52) U.S. Cl.
CPC ............. *F16K 11/078* (2013.01); *F16K 5/12* (2013.01); *F16K 11/0873* (2013.01); *G05D 23/13* (2013.01)

(58) Field of Classification Search
CPC .... F16K 11/08; F16K 11/083; F16K 11/0833; F16K 11/085; F16K 11/0853; F16K 11/087
See application file for complete search history.

(56) References Cited

U.S. PATENT DOCUMENTS

| | | | |
|---|---|---|---|
| 10,184,574 B2 * | 1/2019 | Iversen | ................. F16K 27/067 |
| 2006/0162792 A1 | 7/2006 | Oh et al. | |

FOREIGN PATENT DOCUMENTS

| | | | | |
|---|---|---|---|---|
| CN | 105715829 A | | 6/2016 | |
| CN | 107917246 A | | 4/2018 | |
| DE | 102010006861 A1 | * | 8/2011 | ............ F16K 11/087 |
| EP | 2821679 A1 | * | 1/2015 | .......... F16K 11/0853 |
| GB | 259996 A | | 3/1927 | |
| GB | 2599956 A | * | 4/2022 | ............ E03C 1/023 |
| JP | 2017207157 A | | 11/2017 | |
| WO | WO-2018100872 A1 | * | 6/2018 | ................ F01P 7/14 |

* cited by examiner

*Primary Examiner* — Hailey K. Do (74) *Attorney, Agent, or Firm* — McGlew and Tuttle, P.C.

(57) ABSTRACT

A mixing valve having a first inlet port (4), a second inlet port (6) extending transverse to said first inlet port (4) and an outlet port (8). The inlet ports (4, 6) open out into a valve chamber (10) and the outlet port (8) branches off this valve chamber (10), inside which a movable valve element (12) is arranged, having an obstruction (32) inside the second inlet port (6), which protrudes from an inner circumference (36) of the second port (6) into an interior thereof. The obstruction (32) extends at least along a portion of the inner circumference (36), which portion of the circumference (36) is located on an inner side of the second inlet port (6) being distant from the first inlet port (4). A heating or cooling device includes such a mixing valve.

13 Claims, 4 Drawing Sheets

MIXING VALVE AND HEATING OR COOLING SYSTEM

CROSS REFERENCE TO RELATED APPLICATIONS

This application claims the benefit of priority under 35 U.S.C. § 119 of European Application, 20209825.7 filed Nov. 25, 2020, the entire contents of which are incorporated herein by reference.

TECHNICAL FIELD

The invention refers to a mixing valve and to a heating or cooling system comprising such a mixing valve.

TECHNICAL BACKGROUND

It is known to use mixing valves in heating and/or cooling systems to adjust the temperature of a heating or cooling fluid. In those mixing valves, for example, a return flow is admixed to a supply flow to adjust the temperature of the supply flow. For this, mixing valves having two inlets and one outlet are used. For the control it is known to have temperature sensors in the inlets and the outlets of such a mixing valve. Regarding the temperature sensors in the inlets there is the problem that in case of a higher flow in one of the inlets there may be a certain flow entering from a first inlet into the second inlet influencing the temperature detected in this second inlet.

SUMMARY

An object of the present invention to provide an improved mixing valve, in particular for a heating or cooling system, allowing a more precise temperature measurement in the inlets of the mixing valve. This object is achieved by a mixing valve and a heating or cooling system having features according to the invention. Preferred embodiments are disclosed in the following description and the accompanying drawings.

The mixing valve according to the present invention in particular is a mixing valve designed or configured for use in a heating and/or cooling system to adjust the temperature in a supply flow of a heating and/or cooling circuit. The mixing valve has a first inlet port, a second inlet port and an outlet port. The first inlet port may for example be connected to a heat or cooling source, the second inlet port may for example be connected to a return line of a heating and/or cooling circuit, whereas the outlet port preferably is connected to the feed line of a heating and/or cooling circuit. The mixing valve preferably is designed such that the first inlet port is located on one side, the outlet port is located on another side and the inlet port extends transverse to said first inlet port and preferably said outlet port. Preferably the first inlet port and the outlet port extend along a common axis and the second inlet port extends along an axis transverse to the axis of the first inlet port and preferably the outlet port, further preferred in an angle of 90°. The first inlet port and the second inlet port open out into a valve chamber of the mixing valve. Inside the valve chamber there is arranged a movable valve element to adjust the fluid flow from the first inlet and the second inlet port into the outlet port. The outlet port branches off this valve chamber so that dependent on the position of a valve element inside the valve chamber fluid from the first inlet port and fluid from the second inlet port flows into the outlet port, wherein the ratio of the fluid flows from the first and the second inlet port is adjusted by respective positioning of the valve element inside the valve chamber.

According to the invention there is arranged an obstruction or shoulder inside the second inlet port. This obstruction or shoulder is arranged in a portion of the inlet port adjacent to the valve chamber and in particular forms a surface extending transverse to the longitudinal axis of the second inlet port, i.e. the flow direction through this inlet port. This surface is facing the valve chamber or facing in the direction towards the valve chamber, respectively. By this, the obstruction forms an element reducing or inhibiting a flow into the second inlet port in a direction opposite to the normal flow direction in this second inlet port. By this the entrance of a flow from the first inlet port into the second inlet port is reduced or prevented. Thus, an influence on the temperature measurement inside the second inlet port is reduced or in the ideal case substantially eliminated. To achieve this the obstruction protrudes from an inner circumference of the second port into the interior of the second port such that at least the surface facing into the direction of the valve chamber protrudes into the interior of the inlet port. The obstruction at least extends along a portion of the inner circumference, which portion of the circumference is located on an inner side of the second inlet port being distant from the first inlet port, seen in diameter direction. This means, when seen in diameter direction of the second inlet port one side is the side adjacent to the first inlet port and an opposite side is distant from the first inlet port. The obstruction is at least on the distant side. This means that the obstruction is arranged on the inner circumferential side of the second port being the opposite face to the first inlet port. By this it is achieved that a flow entering the second inlet port from the first inlet port impinges the obstruction on the opposite side and is blocked or deflected by the obstruction so that it does not enter the second inlet port in a further upstream direction, seen in the normal flow direction inside the second inlet port.

According to a preferred embodiment the first inlet port and the outlet port are arranged on opposite sides of the valve chamber with a second inlet port being arranged between the first inlet port and the outlet port. Thus, preferably the arrangement of the two inlet ports and the outlet ports is T-shaped with the first inlet port and the outlet port forming the upper leg of the T-shape, wherein the second inlet port forms the lower transverse leg. In a front view of this T-shape, thus, the first inlet port for example is on the left side, the outlet port on the right side and the second inlet port on the lower side. The arrangement of the obstruction on the inner side of the second inlet port being distant from the first inlet port, thus, would mean that the obstruction is at least arranged on the right side of the inner circumference of the second inlet port, if seen as described before. However, in a further embodiment the first inlet port and the outlet port may be arranged inverted, in this case the obstruction would be located at least on the left side.

Preferably the obstruction is arranged in a half, further preferably at least in a half of the inner circumference of the second inlet port located on an inner side of the second inlet port being distant to the first inlet port, as seen in diameter direction. This means the obstruction is arranged on such half of the inner circumference of the second inlet port, which is distanced from the first inlet port, arranged on a side of the valve away from the first inlet port, preferably on the inner side of the second inlet port which is closer to the outlet port than to the first inlet port.

According to a further preferred embodiment the obstruction extends along the inner circumference of the second inlet port in an angle greater of at least 90°, preferably in an angle greater 180° and further preferable along the entire inner circumference of the second inlet port. The arrangement in an angle smaller than 360° may be sufficient if the obstruction is arranged on such side of the inner circumference of the second inlet port which primarily is impinged by a fluid flow entering from the first inlet port.

An arrangement along the entire inner circumference of the second inlet port may have advantages for design, manufacturing and assembling, since for example during assembling the angular position is not of importance.

According to a further embodiment the obstruction has a first surface on its downstream side, seen in the usual flow direction along the longitudinal axis of the second inlet port, wherein the first surface extends angled with respect to the longitudinal axis of the second inlet port, preferably angled in flow direction in an angle between 15° and 90° with respect to the longitudinal axis. To be angled in flow direction means that the inner radial end or edge of the surface is arranged further downstream in flow direction than the radial outer end or edge of this surface. This first surface forms a surface facing the opening of the second inlet ports towards the valve chamber, i.e. is facing the valve chamber, as discussed above. Thus, this first surface forms a shoulder acting as a flow resistance or deflector for a flow entering the second inlet port in a direction upwards the usual flow direction. By this a flow entering from the first inlet port is deflected or blocked. In case the surface is angled in an angle smaller than 90° the deflection may be enhanced such that a flow entering from the first inlet port is deflected towards the valve chamber and hindered to flow further upwards into the second inlet port.

According to a further preferred embodiment the obstruction, and in particular a first surface as described before, and an adjacent circumferential wall of the second inlet port define a pocket-like area (pocket area) or space on the downstream side of the obstruction or shoulder. Preferably such pocket-like area or structure is located inside the second inlet port such that a flow entering from the first inlet port into the second inlet port impinges the obstruction in the area of this pocket-like structure and is deflected by the obstruction into a direction towards the valve chamber or is trapped inside the pocket-like structure formed by the obstruction and an adjacent circumferential wall.

According to a further preferable embodiment the radial extent of the obstruction or shoulder with respect to the longitudinal axis of the second inlet port, i.e. the longitudinal axis in flow direction, is in the range of three percent to 25 percent of the inner diameter of the second inlet port. If the extent of the obstruction in radial direction is in this range, a sufficient flow resistance against a flow entering in the opposite direction can be provided without increasing the flow resistance in the usual flow direction essentially.

According to a further preferred embodiment the obstruction or shoulder is formed by a step on the inner circumferential wall of the second inlet port or has an inclined second surface facing in up-stream direction, i.e. away from the valve chamber. This second surface preferably extends such that it is inclined in flow direction so that the radial inner side of this surface is located further downstream than the radial outer side, seen in the normal flow direction. In a preferred embodiment the first and the second surface extend substantially in parallel. By the second surface angled the flow in usual flow direction is guided by along the obstruction with a minimized flow resistance.

According to a further preferred solution there is a certain preferred relation between the location of the valve element inside the valve chamber and the location of the obstruction inside the second inlet port. Preferably, the distance between the outer circumferential surface of the valve element, when closing the second inlet port, and the free end of the obstruction nearest or closest to the valve element is in a range between zero and the length of the inner diameter of the second inlet port, preferably of the circumferential wall surrounding the obstruction. Thus, the distance in longitudinal direction of the second inlet port between a valve seat on the second inlet port and the obstruction arranged in the second inlet port is smaller than the inner diameter of the second inlet port. By this it is ensured that the obstruction is in a position which is impinged by a fluid flow through the first inlet port when the valve opens both inlet ports.

A temperature sensor inside the second inlet port, preferably, is arranged further upstream from the obstruction, seen in the usual flow direction through the second inlet port. Thus, the obstruction keeps a fluid entering from the first inlet port away from such temperature sensor.

There are different possibilities to arrange or form the obstruction inside the second inlet port. One possibility may be that said obstruction is at least partly arranged on an insert which is inserted into the second inlet port. Forming the obstruction on an insert may have different advantages. One advantage may be that it is easier to manufacture the obstruction on an insert than directly inside the inlet port, which for example may be a portion of a complex valve housing. Furthermore, by use of different inserts it may easily be possible to provide obstructions in different size or shape for different applications. Furthermore, it may be possible to arrange such an insert in existing valves without changing the design of the valve housing providing the inlet ports.

According to a further alternative or additional solution at least a portion of the obstruction is integrally formed with an element comprising a valve seat for the valve element (formed as one piece with an element comprising a valve seat for the valve element). For example the valve seat and the obstruction may be arranged or provided by the same element, preferably designed as an insert inserted into the second inlet port. The arrangement on an insert, furthermore, allows to use a different material. For example it may be possible to use an elastic material for the obstruction, thus a flow in a direction opposite to the normal flow direction bends out the obstruction to increase the flow resistance, whereas in usual flow direction the obstruction is preferably bent towards the wall and out of the flow path to reduce the flow resistance. To provide the obstruction on the element at the same time forming at least a part of the valve seat, may for example be advantageous in case that an elastic material is used, since an elastic material may have advantages for both, the valve seat and the obstruction.

In a further alternative or additional solution at least a portion of the obstruction is integrally formed with at least a portion of a valve housing defining the second inlet port (formed as one piece with at least a portion of a valve housing). The integral arrangement of the obstruction with the housing defining the inlet port may for example simplify an assembling of the valve.

It is to be understood that the different structures of the obstruction as described above may be realized as alternative designs or in combination. For example a portion of the obstruction may be formed integrally with the valve housing, wherein another portion is formed on an insert, for example a separate insert or integrally with an insert providing a valve seat.

According to a further design of the obstruction the cross section of the second inlet port may be enlarged upstream said obstruction. Thus, the obstruction decreases the free inner diameter of the second inlet port. The transition portion between the enlarged diameter and the smaller diameter preferably is designed in streamlined manner to reduce the flow resistance.

The valve element preferably is ball-shaped, i.e. has a basic shape like a ball. The valve element may have openings or cutouts providing flow paths through the valve depending on the position of the valve element or the ball, in particular on the angular position about a rotational axis of the valve element. To adjust the flows the ball-shaped valve element preferably is rotated about a rotational axis, the axis, preferably extending transverse, further preferably rectangularly to a plane spanned by the longitudinal axes of the inlet ports and the outlet port.

As already described above preferably the mixing valve comprises at least one temperature sensor being arranged on or in the second inlet port upstream the obstruction. This temperature sensor is used to detect the temperature of the fluid entering the valve space via the second inlet port. In a heating system this for example is a return temperature from a heating circuit. The mixing valve may comprise further temperature sensors, for example a temperature sensor inside or on the outlet port to detect the outlet temperature of the mixing valve, which for example is the feed temperature for a heating or cooling circuit.

Beside the mixing valve as described above a heating or cooling system is subject of the present invention. This heating or cooling system comprises a mixing valve as described above. It is to be understood that preferred features of the mixing valve as described above are preferred embodiments of the heating or cooling system, too. Vice versa preferred solutions described with reference to the heating or cooling system, should be regarded as preferred embodiments of the mixing valve, too.

In the heating or cooling system, the mixing valve as described above is used to adjust the temperature of a fluid flow, for example the feed temperature of a heating or cooling circuit. The first inlet port and the second inlet port are provided to deliver fluid flows of different temperature. Thus, by adjusting the position of the valve element inside the mixing valve the mixing ratio of these two fluid flows of different temperature can be changed to adjust the outlet temperature of the mixing valve. Preferably, the outlet port of the valve is connected to the supply line of a heating or cooling circuit. In a heating system the first inlet port for example may be connected to a heat source, for example a boiler. In a cooling system the first inlet port may be connected to a cooling device. The second inlet port preferably is connected to a return line from a heating or cooling circuit. Thus, in a heating device the temperature of the fluid fed through the first inlet port can be reduced by admixing fluid from the second inlet port having a lower temperature. In case of a cooling application the temperature may be increased by admixing warmer fluid to a cool fluid flow fed through the first inlet port. In such heating or cooling system in at least one operational condition the flow through the second inlet port may be lower than the flow through the first inlet port. In particular in this operational condition the obstruction as discussed above, is advantageous, since it prevents the higher fluid flow to enter the second inlet port and to influence a temperature measurement inside the second inlet port. According to the invention it is intended that the mixing point or mixing region, in which the fluid flows from the first and second inlet port are admixed, is located inside the valve space and not inside one of the inlet ports. This allows an exact temperature measurement in both inlet ports without any influence from the other inlet port.

In the following the description is described by way of example with reference to the accompanying drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Referring to the drawings, in all the shown embodiments the mixing valve comprises a valve housing 2 defining a first inlet port 4, a second inlet port 6 and an outlet port 8. The two inlet ports 4 and 6 and the outlet port 8 are connected to a valve chamber 10 inside the valve housing 2. This means the two inlet ports 4 and 6 open out into the valve chamber 10 and the outlet port 8 branches off this valve chamber 10. Inside the valve chamber 10 there is arranged a movable valve element 12, which in this embodiment is ball-shaped. The valve element 12 comprises an opening or cut out 14 enabling a flow path from the first inlet port 4 and/or the second inlet port 6 towards the outlet port 8. In the shown position of the valve element both inlet ports 4 and 6 are open towards the outlet port 8, such that two flows from the inlet ports 4 and 6 are mixed in the valve chamber. The ball-shaped valve element 12 in this embodiment is rotatable about a rotational axis R extending normal to the plane of the figures. The valve element 12 may be rotatable about the axis R by a drive motor 16 as schematically shown in FIG. 7. Depending on the rotational position of the valve element 12 the first inlet port 4 can be fully closed or the second inlet port 6 can be fully closed. In intermediate positions the two inlet ports can be partly open with changing flow ratio depending on the rotational position of the valve element 12.

The mixing valve as shown in FIGS. 1 to 6 can for example be used in a heating circuit or system as shown in FIG. 7. In this example the mixing valve 18 is connected to a heat source 20, for example a boiler, and a heating circuit 22, for example a floor heating circuit of a building. In the feed line towards the heating circuit 22 there is arranged a circulator pump 24 for providing a fluid flow through the heating circuit 22. The outlet port 8 of the mixing valve 18 is connected to this feed line of the heating circuit 22. The first inlet port 4 of the mixing valve 18 is connected to an outlet of the heat source 20 and the second inlet port 6 of the mixing valve 18 is connected to a return line 26 of the heating circuit 22. The return line 26 is connected to the inlet of the heat source 20. A connection to the second inlet port 16 branches off this return line 26. The mixing valve 18 allows to admix a return flow from the return line 26 via the second inlet port 6 into a fluid flow of heating medium or fluid from the heat source 20 to adjust the temperature in the feed line of the heating circuit 22. By admixing fluid from the return line the temperature can be reduced in known manner. A similar design can be used for a cooling circuit. In a cooling circuit the heat source 20 would be replaced by a cooling device. In case of a cooling system, thus, warm water from the return line 26 would be admixed to the flow of cool water to adjust the temperature.

For the control of the mixing valve there is arranged at least one temperature sensor 28 at least inside the second inlet port 6. Detecting the temperature inside the second inlet port 6 may be problematic in case that the fluid flow or pressure inside the first inlet port 4 is higher than in the second inlet port 8. Under these circumstances there may occur the problem that a fluid flow from the first inlet port enters into the second inlet port 6 against or upstream the usual flow direction 30 inside the second inlet port 6. This would influence the temperature detected by temperature sensor 28. To reduce or eliminate this problem, there is arranged an obstruction 32 inside the second inlet port 6. In the embodiments shown in FIGS. 1 and 3 to 6 the obstruction 32 is ring-shaped extending along the entire inner circumference of the second inlet port 6 about the longitudinal axis X in flow direction 30. However, as explained with reference to FIG. 2 it would be sufficient to arrange the obstruction 32 on one side of the inner circumference of the second inlet port 6 only. The obstruction 32 should be arranged at least on the inner side which is distant from the first inlet port 4, i.e. on the side of the inlet port 6, which is closer to the outlet port 8. In these preferred embodiments the first inlet port 4 and the outlet port 8 extend along the same longitudinal axis Y, with the second inlet port 6 extending transverse. This means, when seen in FIG. 2 the obstruction 32 is arranged on a diameter side, with reference to the longitudinal direction X, of the second inlet port 6, which is away from the side on which the first inlet port 4 is located. The obstruction 32 is arranged on the side towards the outlet port 8. Thus, the obstruction 32 is arranged on a inner side of the second inlet port 6 which is facing the first inlet port 4. Thus, a fluid flow from the first inlet port 4 would primarily impinge on the side opposite, i.e. facing the first inlet port 4 which is the side with the obstruction 32. Thus, the obstruction 32 can influence a fluid flow entering from the first inlet port 4 into the second inlet port 6. Preferably, the obstruction 32 extends at least along an angle of 90° about the longitudinal axis X, preferably at least along an angle of 180° and further preferred along the entire circumference as shown in the other figures.

The obstruction 32 as shown, is angled with respect to the longitudinal axis X such that it forms a pocket-like area 34 facing down-stream in flow direction 30, i.e. facing towards the valve chamber 10. By this, the obstruction 32 can deflect a fluid flow entering in a direction opposite to the flow direction 30 and/or block such fluid flow. By this, it is prevented that the fluid flows further upstream against the usual flow direction 30, so that an influence on the temperature in the area, in which the temperature sensor 38 is located, can be reduced or eliminated.

Concerning the size and position of the obstruction 32 there are some preferred parameters. For example the distance d between the inner free end of the obstruction 32 and the outer circumference of the ball-shaped valve element 2 should be larger than zero and smaller than the inner diameter D of the second inlet port 6 adjacent to the valve chamber 10. The angle A between the obstruction 32 and the inner circumferential wall 36 of the second inlet port 6, i.e. the angle A between the obstruction 32 and the longitudinal axis X should preferably be in a range between 15° and 90°. The angle A is the angle between a surface on the downstream side of the obstruction 32, seen in usual flow direction, and the inner circumferential wall 36 of the second inlet port 6 adjacent to the valve chamber 10. The radial extension r of the obstruction 32 is preferably larger than three percent of the diameter D and smaller than 25 percent of the diameter D described above. The radial extension r is the radial distance of the inner free end of the obstruction 32 from the inner circumferential wall 36 of the second inlet port 6 adjacent to the valve chamber 10. The obstruction 32 extends from the inner circumferential wall 36 into the interior of the second inlet port 6 by the radial extension r. At the same time the obstruction 32 is angled or extends obliquely to the inner circumferential wall 36 by the angle A to form the pocket-like area or space 34.

Figure 3:
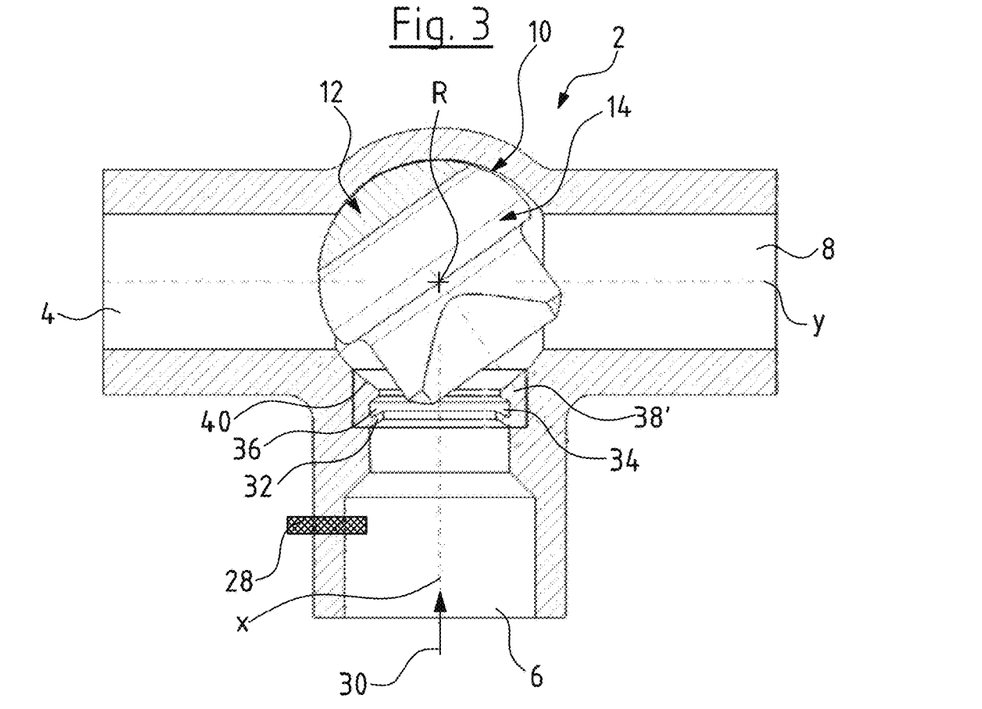
FIG. 3 is a cross sectional view of a mixing valve according to a second embodiment.

Beside this general preferred structure of the obstruction 32 there are several possibilities to arrange or provide such an obstruction 32 inside the second inlet port 6. As shown in the example in FIG. 1 the obstruction 32 is provided on an insert 38 inserted into the second inlet port 6 and at the same time forming a valve seat for the valve element 12. Furthermore, in this design the obstruction 32 has the shape of a ring-shaped lip extending into the interior of the second inlet port 6. FIG. 3 shows a similar embodiment with an insert 38'. In this embodiment the valve seat is enlarged so that also the valve seat 40 comprises a portion extending into the interior of the second inlet port 6.

Figure 4:
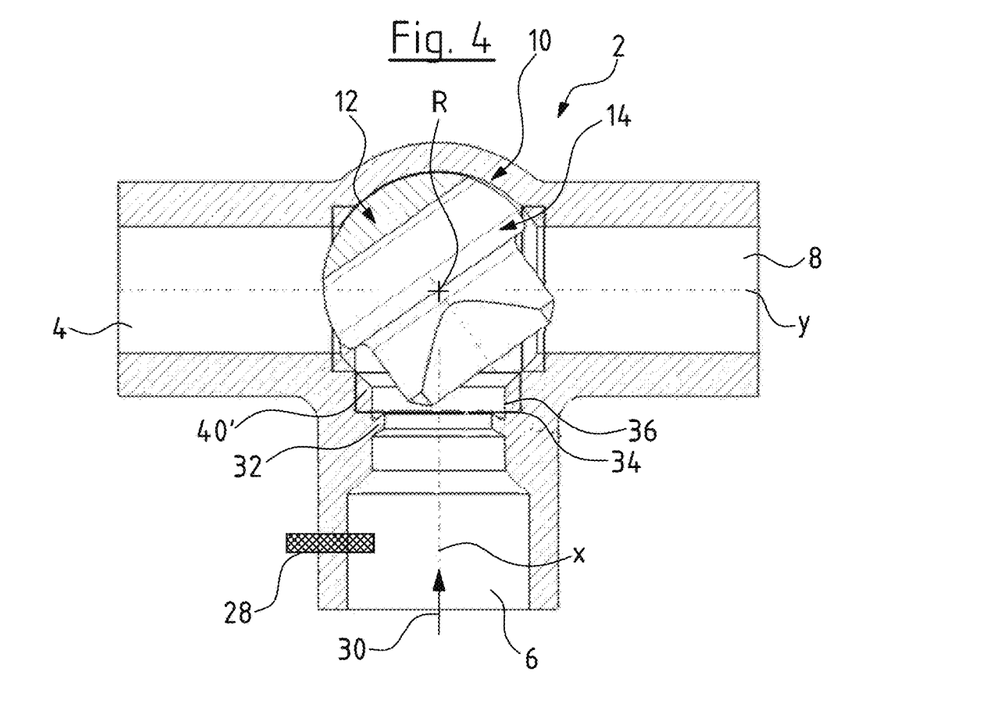
FIG. 4 is a cross sectional view of a mixing valve according to a third embodiment.

In the embodiment according to FIG. 4 the obstruction 32 is integrally formed with the valve housing 2, i.e. with the portion of the valve housing 2 defining the second inlet port 6. In this embodiment only the valve seat 40' is formed as an insert.

Figure 5:
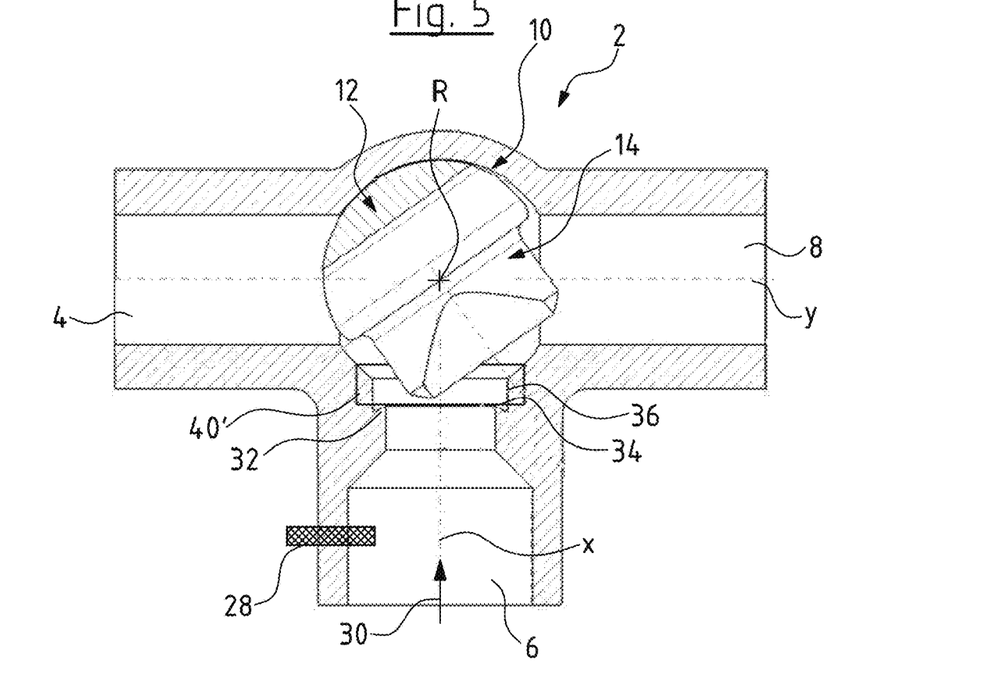
FIG. 5 is a cross sectional view of a mixing valve according to a fourth embodiment.

Also in the further embodiment shown in FIG. 5 the obstruction 32 is integrally formed with the portion of the valve housing 2 defining the second inlet port 6. However, in this embodiment the obstruction 32 is not lip-shaped but has a shape of a shoulder defining the pocket-like area 34. In longitudinal direction, i.e. in direction of the longitudinal axis X the obstruction 32 forms a reduction in diameter inside the second inlet port 6 extending in upstream direction. Further upstream the diameter is enlarged.

Figure 6:
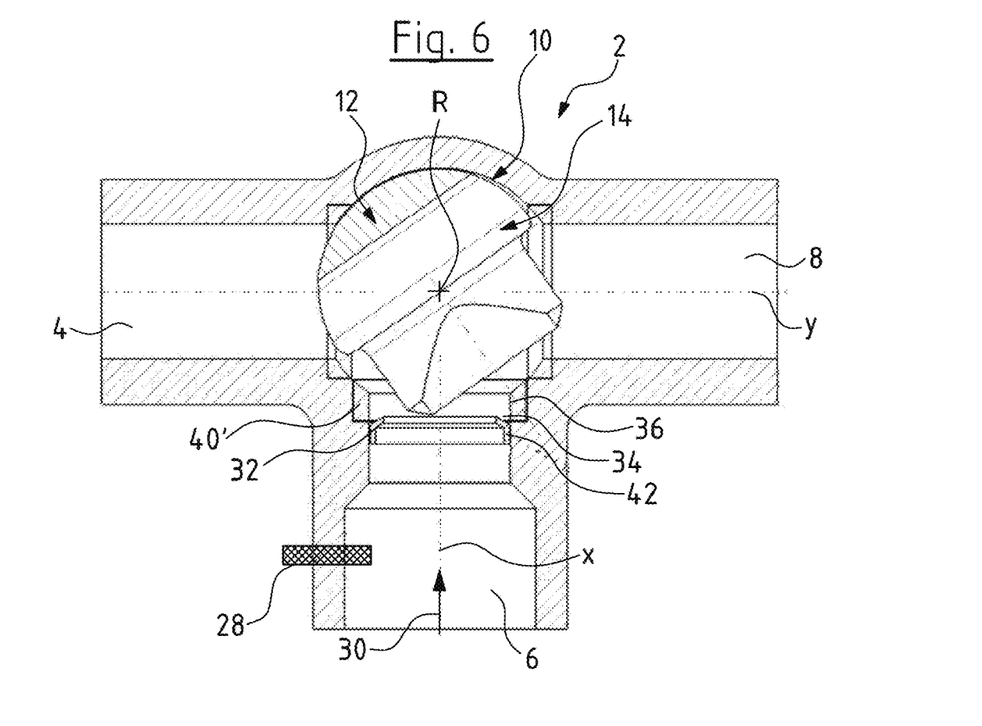
FIG. 6 is a cross sectional view of a mixing valve according to a fifth embodiment.
Figure 7:
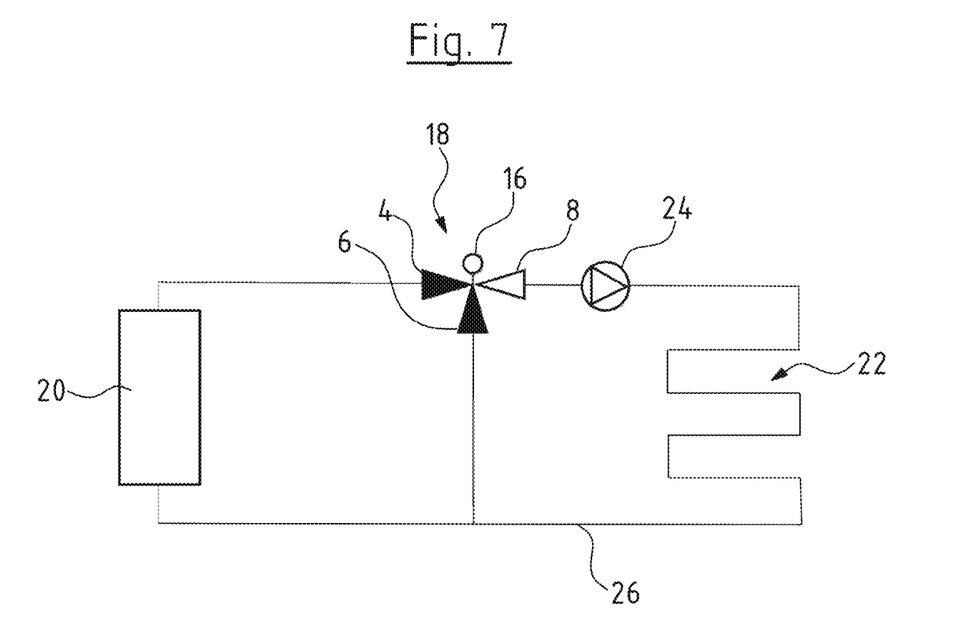
FIG. 7 is a schematic diagram of a heating device comprising a mixing valve.

Also in the embodiment according to FIG. 6 the obstruction 32 is formed on an insert 42. However, in this embodiment the insert 42 defining the obstruction 32 is independent from the insert 40' defining the valve seat.

Figure 1:
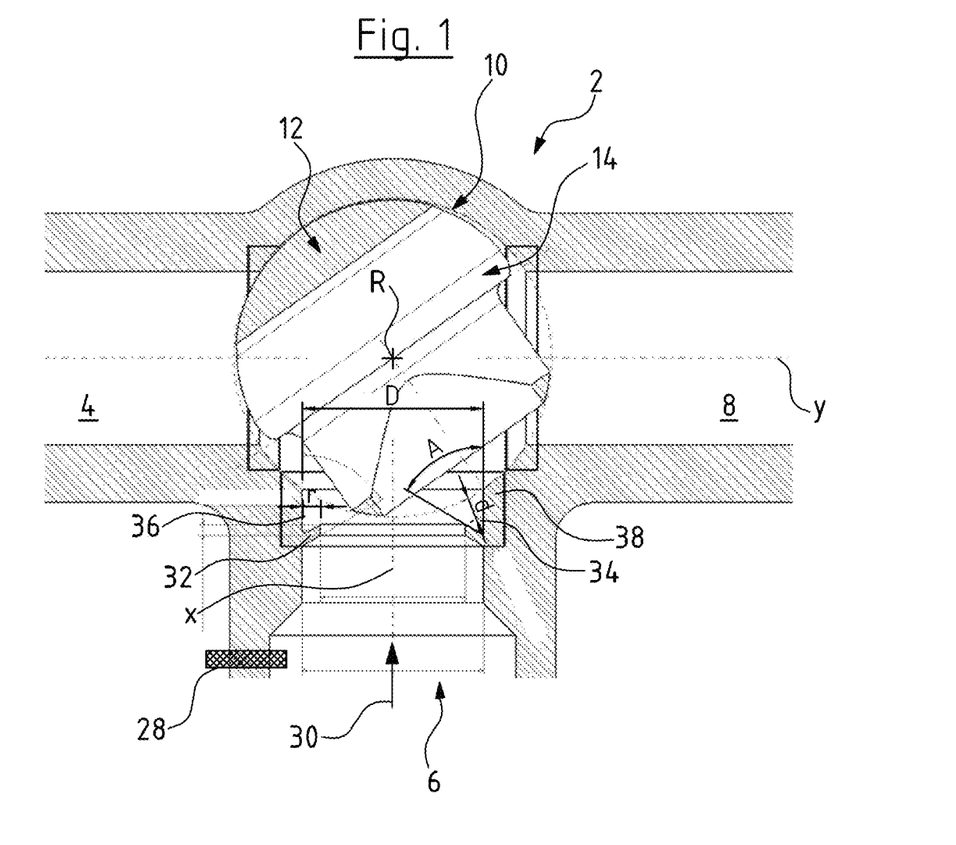
FIG. 1 is a cross sectional view of a mixing valve according to a first embodiment of the invention.
Figure 2:
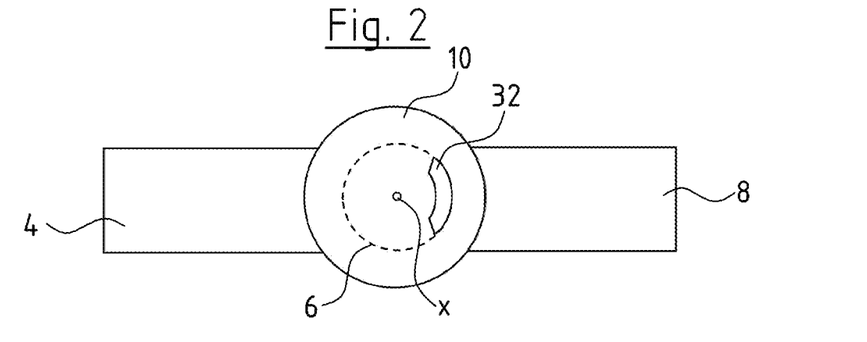
FIG. 2 is a schematic top view of a mixing valve according to the invention.

It has to be understood that all the dimensions explained with reference to FIG. 1 could be used in the same way for the embodiments shown in FIGS. 3 to 6. Furthermore, other possibilities to arrange an obstruction 32 on the inner circumference of the second inlet port 6 can be used to achieve similar effects.

While specific embodiments of the invention have been shown and described in detail to illustrate the application of the principles of the invention, it will be understood that the invention may be embodied otherwise without departing from such principles.

| Reference characters | |
|---|---|
| 2 | valve housing |
| 4 | first inlet port |
| 6 | second inlet port |
| 8 | outlet port |
| 10 | valve chamber |
| 12 | valve element |
| 14 | opening |
| 16 | drive motor |
| 18 | mixing valve |
| 20 | heat source |
| 22 | heating circuit |
| 24 | circulator pump |
| 26 | return line |
| 28 | temperature sensor |
| 30 | flow direction |
| 32 | obstruction |
| 34 | pocket-like area |
| 36 | inner circumferential wall |
| 38, 38' | insert |
| 40, 40' | valve seat, insert forming valve seat |
| 42 | insert |
| R | rotational axis |
| x, y | longitudinal directions |
| d | distance |
| D | diameter |
| A | angle |
| r | radial extension |

What is claimed is:

1. A mixing valve comprising:
a first inlet port;
a second inlet port extending transverse to said first inlet port;
an outlet port, wherein the first and second inlet ports open out into a valve chamber and the outlet port branches off the valve chamber;
a movable valve element arranged inside the valve chamber;
an obstruction inside the second inlet port, the obstruction protruding from an inner circumference of the second inlet port into an interior of the second inlet port, and extending along an entire inner circumference, wherein the obstruction and an adjacent circumferential wall define a fluid communicating pocket area on a downstream side of the obstruction, wherein a radial extent of the obstruction with respect to the longitudinal axis of the second inlet port is in the range of 3% to 25% of an inner diameter of the second inlet port; and
a temperature sensor arranged on or in the second inlet port, upstream of the obstruction.

2. A mixing valve according to claim 1, wherein the first inlet port and the outlet port are arranged on opposite sides of the valve chamber with the second inlet port being arranged between the first inlet port and the outlet port.

3. A mixing valve according claim 1, wherein a distance between an outer circumferential surface of the valve element, with the second inlet port closed, and a free end of the obstruction closest to the valve element is in a range between zero and a length of the inner diameter of the second inlet port.

4. A mixing valve according to claim 1, wherein the obstruction is at least partly arranged on an insert which is inserted into the second inlet port.

5. A mixing valve according to claim 1, wherein at least a portion of the obstruction is integrally formed with a valve element comprising a valve seat for the valve element.

6. A mixing valve according to claim 1, wherein at least a portion of the obstruction is integrally formed with at least a portion of a valve housing defining the second inlet port.

7. A mixing valve according to claim 1, wherein a cross-section of the second inlet port is enlarged upstream of said obstruction.

8. A mixing valve according to claim 1, wherein the valve element is ball shaped.

9. A mixing valve according claim 1, wherein:
the obstruction has a first surface on a downstream side, downstream with respect to a flow direction along a longitudinal axis of the second inlet port;
the first surface extends angled with respect to the longitudinal axis of the second inlet port.

10. A mixing valve according to claim 9, wherein the first surface is angled for a flow direction at an angle between 15° and 90° with respect to the longitudinal axis.

11. A mixing valve comprising:
a first inlet port;
a second inlet port extending transverse to said first inlet port;
an outlet port, wherein the inlet ports open out into a valve chamber and the outlet port branches off the valve chamber;
a movable valve element arranged inside the valve chamber; and
an obstruction inside the second inlet port, the obstruction protruding from an inner circumference of the second inlet port into an interior of the second inlet port, and extending along at least a portion of the inner circumference, wherein said portion of the inner circumference is located on an inner side of the second inlet port that is distant from the first inlet port, wherein a radial extent of the obstruction with respect to the longitudinal axis of the second inlet port is in the range of 3% to 25% of an inner diameter of the second inlet port.

12. A mixing valve comprising:
a first inlet port;
a second inlet port extending transverse to said first inlet port;
an outlet port, wherein the first and second inlet ports open out into a valve chamber and the outlet port branches off the valve chamber;
a movable valve element arranged inside the valve chamber;
an obstruction inside the second inlet port, the obstruction protruding from an inner circumference of the second inlet port into an interior of the second inlet port, and extending along an entire inner circumference, wherein the obstruction and an adjacent circumferential wall define a fluid communicating pocket area on a downstream side of the obstruction, wherein a distance between an outer circumferential surface of the valve element, with the second inlet port closed, and a free end of the obstruction closest to the valve element is in a range between zero and a length of the inner diameter of the second inlet port; and
a temperature sensor arranged on or in the second inlet port, upstream of the obstruction which portion of the inner circumference is located on an inner side of the second inlet port that is distant from the first inlet port.

13. A mixing valve comprising:
a first inlet port;

a second inlet port extending transverse to said first inlet port;

an outlet port, wherein the first and second inlet ports open out into a valve chamber and the outlet port branches off the valve chamber;

a movable valve element arranged inside the valve chamber;

an obstruction inside the second inlet port, the obstruction protruding from an inner circumference of the second inlet port into an interior of the second inlet port, and extending along an entire inner circumference, wherein the obstruction and an adjacent circumferential wall define a fluid communicating pocket area on a downstream side of the obstruction, wherein at least a portion of the obstruction is integrally formed with at least a portion of a valve housing defining the second inlet port; and a temperature sensor arranged on or in the second inlet port, upstream of the obstruction which portion of the inner circumference is located on an inner side of the second inlet port that is distant from the first inlet port.

* * * * *